United States Patent

[11] 3,628,063

[72] Inventor Mordechai I. Tamari
Babylon, N.Y.

[21] Appl. No. 846,499

[22] Filed July 31, 1969

[45] Patented Dec. 14, 1971

[73] Assignee Computer Transceiver Systems, Inc.
Upper Saddle, N.J.

[54] RECEIVER FOR FREQUENCY SHIFT KEYED SIGNALS

13 Claims, 4 Drawing Figs.

[52] U.S. Cl. 307/251, 307/255, 307/246, 307/229, 307/237

[51] Int. Cl. H03k 5/08

[50] Field of Search 307/246, 255, 293, 210, 294, 229, 237, 261

[56] References Cited

UNITED STATES PATENTS

| | | | |
|---|---|---|---|
| 3,160,766 | 12/1964 | Reymond | 307/255 |
| 3,223,929 | 12/1965 | Hofstad et al. | 307/210 X |
| 3,368,153 | 2/1968 | Garde | 307/246 X |
| 3,458,232 | 7/1969 | Robinson | 307/293 X |
| 3,497,723 | 2/1970 | Nelson | 307/294 X |

*Primary Examiner*—John S. Heyman
*Attorney*—Camil P. Spiecens

ABSTRACT: A transceiver is connected to a line for transmitting tones to a remote point and receiving tones from the remote point. The receiver portion of the transceiver comprises a filter means, a band-pass limiter amplifier, a frequency-to-voltage converter, a difference amplifier, a Schmitt trigger and an output amplifier connected in series to a utilization device whereby the tones are converted to voltage pulses.

TRANSCEIVER 10

INVENTOR.
Mordechai I. Tamari
BY
ATTORNEY

RECEIVER FOR FREQUENCY SHIFT KEYED SIGNALS

This invention pertains to signal receivers and more particularly to signal receivers which receive frequency-shift keyed tone signals and convert the signals to voltage pulses.

In the field of data communication, there is an expanding area wherein a plurality of remote terminals communicate with a central data processor. The communication link now becoming increasingly popular is conventional public utility telephone lines. The nature of the telephone lines and the switching equipment makes frequency-shift keying techniques more reliable than start-stop coding techniques for the transmission of digital equipment.

In spite of the fact that the telephone companies have made available digital modems, many users prefer using acoustic couplers which require only a conventional telephone for connecting to the telephone lines.

The nature of the digital information being transferred requires that there be a very high reliability in the transmission and reception of the information. Therefore, the receiving equipment must have built into it considerable immunity to transient noise, ringing transients when the signal shifts from one frequency to another and signal jitter. Furthermore, many systems operate in duplex wherein the information receiving transceiver transmits a tone of a given frequency to the remote transmitting transceiver to indicate to the latter that there is a connection between the two. In turn the information transmitting transceiver transmits the digital information by transmitting coded tones which shift between two frequencies that are different from the frequency of the tone transmitted by the receiving transceiver. The nature of the telephone lines is such that they have a limited band-pass. Therefore, there can only be a limited separation between the transmitting and receiving frequencies. This limited separation also imposes problems in the design of the receiver portion of the transceiver.

It is accordingly a general object of the invention to provide an improved receiver for receiving frequency-shift keyed signals which solves in an economical and reliable manner the above-cited problems.

Briefly, the invention contemplates a receiver for receiving frequency-shift keyed signals representing digital data which comprises a band pass limiter amplifier means for receiving the frequency-shift keyed signals and transmitting square wave signals having frequencies within a given band of frequencies. A frequency-to-voltage converter means receives the square wave signals and transmits signals having amplitudes linearly related to the frequencies of the square wave signals. A difference amplifier receives the signals from the converter and transmits a signal having a first amplitude when the signal it receives is below a given amplitude, transmits a signal having a second amplitude when it receives a signal having an amplitude above a second given amplitude and linearly transmits a signal when the received signal is between the two given amplitudes.

A feature of the invention is directed to a new and highly efficient band-pass limiter amplifier.

Another feature of the invention is directed to novel combinations of frequency-to-voltage converters operating in conjunction with difference amplifiers to reliably convert frequency-shift keyed signals representing binary digits to voltage pulses representing these same binary digits.

Other objects, the features and advantages of the invention will be apparent from the following detailed description when read with the accompanying drawing which show a preferred embodiment of the invention.

Figure 1:
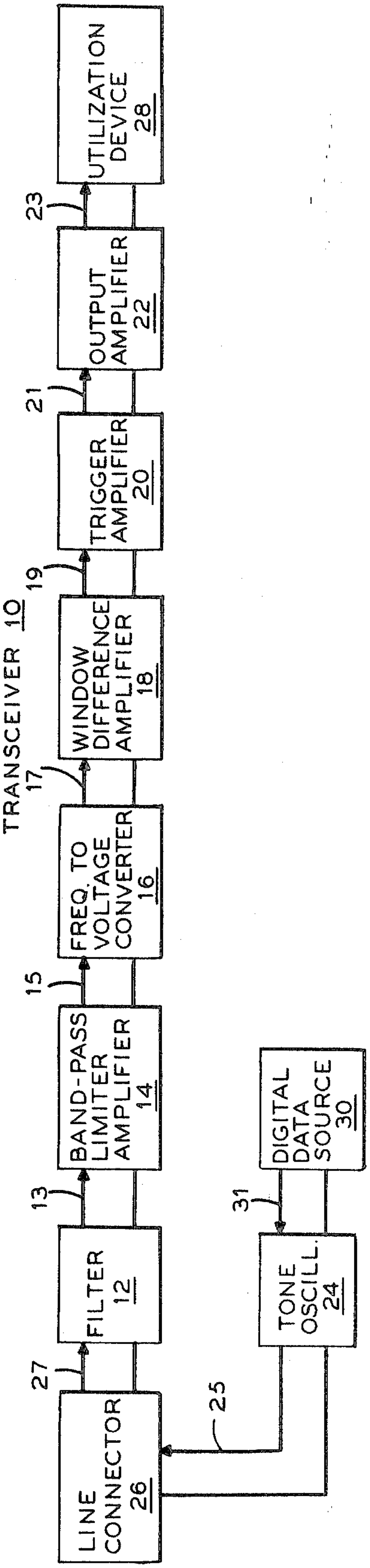
FIG. 1 shows in block diagram form a transceiver for transmitting and receiving digital data.

In FIG. 1 there is shown a transceiver 10 comprising: a receiver section including a serially connected filter 12, a band-pass limiter amplifier 14, a frequency-to-voltage converter 16, a difference amplifier 18, a Schmitt trigger amplifier 20 and an output amplifier 22; and a transmitter section comprising tone oscillator 24. The receiver section connects a line connector 26, which can be connected to a telephone line, to a data utilization device 28 which can process digital data. The transmitter section connects digital data source 30 to line connector 26.

The digital data is in the form of coded combinations of bits of information. For example, a binary one (mark) can be represented by a pulse, a voltage of a first amplitude or polarity, or a burst of tone having a first frequency, and a binary zero (space) can be represented by the absence of a pulse, a voltage of a second amplitude or polarity, or a burst of tone at a second frequency. By way of example, it will be assumed that the digital data from digital data source 30 is represented by different amplitude voltages and the digital data utilized in device 28 is in a similar form. On the other hand, the digital data passing through line connector 26 is represented by bursts of tone of different frequencies. As an example, considering duplex operation, the tones transmitted from the transmitter section to the line connector 26 switch between 1,270 and 1,070 Hz., while the tones received by the receiver section from line connector 26 switch between 2,225 Hz. and 2,025 Hz. It is the function of the receiver section to convert a burst of 2,225 Hz. signal representing a mark, to one voltage level and a burst of 2,025 Hz. signal, representing a space, to a different voltage level. Also, it is the function of the transmitter section to convert a signal of one voltage level to a burst of 1,270 Hz. signal and a signal of another voltage level to a burst of 1,070 Hz. signal representing marks and spaces.

Since the invention resides in the receiver section, the transmitter section which comprises tone oscillator 24 will only be briefly described. In fact, tone oscillator 24 can be a conventional voltage controlled oscillator which is tuned to transmit the required frequency signals on line 25 in response to the amplitude of the voltage signals' received via line 31, from digital data source 30. The only point worth noting is that tone oscillator 24 can be transmitting the 1,270 Hz. and 1,070 Hz. signals while signals are received from the communication link via line connector 26. Therefore, the receiver section must include frequency selective circuits. The receiver section will now be described. Filter 12 has an input connected via line 27 to the output of line connector 26. The filter is so constructed to have a band-pass section to pass frequencies between 1,700 Hz. and 2,500 Hz. a first band stop section sharply tuned to 1,270 Hz. and a second band stop section sharply tuned to 1,070 Hz. Thus filter 12 passes onto line 13 signals within the range of 1,800 Hz. to 2,400 Hz. which encompasses the frequencies of received data but blocks the frequencies of any transmitted data.

Figure 2:
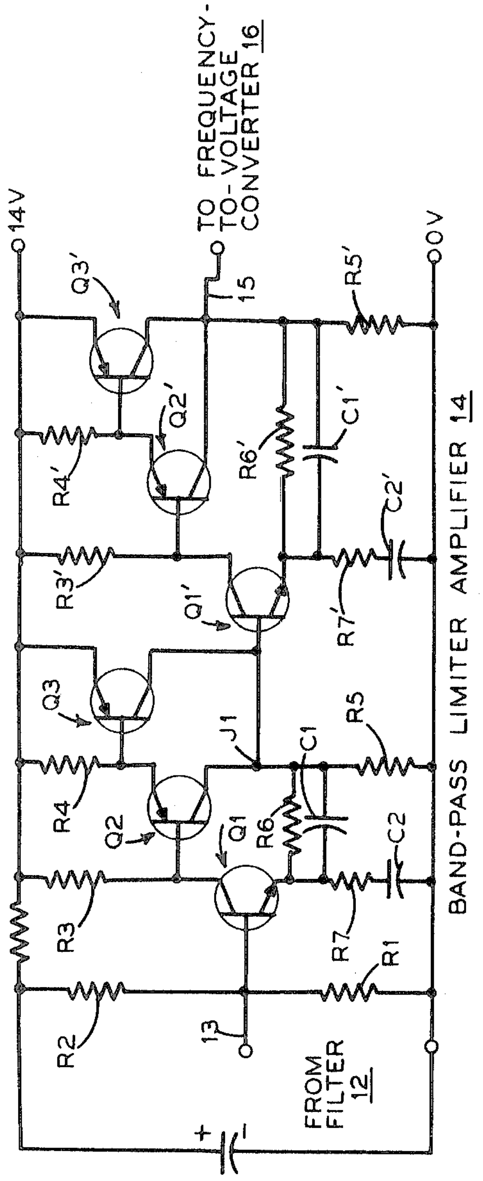
FIG. 2 shows a schematic diagram of a band-pass limiter amplifier used in the transceiver of FIG. 1.

Band-pass limiter amplifier 14 receives the signals which are substantially sinusoidal on line 13 and will only amplify signals within the range 800 Hz. to 3,500 Hz. Its band-pass function is to insure that no ambient noise such as power supply noise, transient electromagnetic radiation noise from ignitions, switching devices, etc., entering the system is amplified. The gain of the amplifier is such that for normal input signals it is completely overdriven with the lobes of the sinusoids clipped. Therefore amplifier 14 transmits onto line 15 a square wave having a frequency equal to the input signal frequency and which can be considered to be a series of equiamplitude pulses whose repetition rate is directly related to the frequency of the input signal. The details of the band-pass limiter amplifier 14 will hereinafter be described with respect to FIG. 2.

The frequency-to-voltage converter 16 receives the equiamplitude pulses (the square wave) on line 15 and converts it to a voltage whose amplitude is linearly related to the frequency of the input signal. When the frequency of the input signal goes from the lower value to the upper value the amplitude of the voltage on line 17, connected to the output of converter 16, also goes from a lower value to an upper value, and vice versa. The details of converter 16 will hereinafter be described with respect to FIGS. 3 and 4.

Difference amplifier 18 operating as a window amplifier receives the voltage signal on line 17. Amplifier 18 is so designed that it has a reference voltage input, internal thereto, which receives a substantially constant amplitude reference voltage. The amplitude of the reference voltage establishes a range of amplitudes for input signals which will be passed by the amplifier. If the latter is less than one given amplitude related to the reference voltage and regardless of how much, amplifier 18 transmits a voltage signal having first given value, and if said latter is greater than another given amplitude related to the reference voltage and regardless of how much, amplifier 18 transmits a voltage signal having a second given value. If the input signal is between the two given amplitudes it is linearly amplified. The given amplitudes bracket the transition region of the amplitude of the input signal between marks and spaces. The output of the difference amplifier 18 is connected to line 19. The signals on line 19 center around the transition region between marks and spaces and range between two limits.

However, this signal has a limited range and is trapazoidal with possible ripple on its flanks. In order to sharpen the leading and trailing flanks a regenerative amplitude discriminator is required. This is accomplished by means of a "Schmitt Trigger" circuit which triggers to transmit a voltage of one amplitude level when it receives a voltage signal whose amplitude is rising and passes a given level and which triggers back to transmit a voltage of another level when the input voltage falls from a certain level and passes another given level. By incorporating a high degree of hysteresis into the Schmitt trigger circuit which is contrary to normal design, any possible "ripple" on the flanks of the input voltage fed thereto from the difference amplifier is prevented from causing spurious triggering.

The output of trigger amplifier 20 is coupled via line 21, output amplifier 22 (of conventional design) and line 23 to utilization device 28.

Band-pass limiter amplifier 14 will now be described. In order to obtain the overall gain two identical amplifier stages are employed. Therefore, only one stage will be described in detail and primed reference characters employed to designate those elements of the second stage that are identical to corresponding elements in the other stage.

The first stage of amplifier 14 centers around NPN-transistor Q1 in a common-emitter configuration whose base electrode (the input of the amplifier) is connected to line 13 to receive signals from filter 12. Base bias is obtained by connecting the base electrode to the junction of resistors R1 and R2, connected in series between source of operating potential 14V and source of operating potential OV. The resistor R3 connects the collector electrode (the output of transistor Q1) to source of potential 14V. The collector electrode of transistor Q1 is also connected to the base electrode of transistor Q2 which operates with transistor Q3 to provide a very high gain phase inverting amplifier. PNP-transistors transistors Q2 and Q3 are connected in a Darlington configuration wherein their respective collector electrodes are connected to a common junction J1 which is the output of the stage. Furthermore, the emitter electrode of transistor Q2 is connected via resistor R4 to source of potential 14V and also to the base electrode of transistor Q3. The emitter electrode of transistor Q3 is directly connected to source of operating potential 14V. Collector load resistor R5 connects the junction J1 of the collector electrodes of transistors Q2 and Q3 to source of potential OV. Now the stage is a negative feedback amplifier with the feedback network comprising the parallel array of resistor R6 and capacitor C1 connecting junction J1 to the emitter electrode of transistor Q1, and the series array of resistor R7 and capacitor C2 connecting the emitter electrode of transistor Q1 to source of potential OV.

Capacitors C1 and C2 are so chosen that at the center of the frequency range capacitor C1 acts as a very high impedance and capacitor C2 as a very low impedance. At low frequencies capacitor C2 becomes a high impedance and at high frequencies capacitor C1 becomes a low impedance.

Now if the open circuit gain of the stage, i.e., no connection between the emitter electrode of transistor Q1 and junction J1 is chosen to be greater than the quotient of the value of the resistance of resistor R6 divided by the value of the resistance of resistor R7, the gain of the stage at midband is this ratio. At higher frequencies, the shunting effect of capacitor C1 comes into effect and lowers this ratio by decreasing the effective value of resistor R6. At lower frequencies, the increase in the impedance of capacitor C2 effectively adds to the value of resistor R7 again lowering this ratio. In this manner, the band-pass properties of the stage are obtained. In addition, by using a feedback type of amplifier per se, there is considerable noise immunity.

Because the gain of the stages is made so high, the amplification of the signals received on line 13 are so great at junction J1 that the second stage centered around transistor Q1 whose base electrode is connected to junction J1 swings in and out of saturation to provide the limiting and resultant square wave shaping with large current gain. In particular, the output signal's voltage swing is limited by the operating potentials. When the output voltage tries to exceed this range there is no longer any negative AC feedback and the amplifier has a very large current gain with the output voltage clamped to the operating potentials.

It should be noted that transistors Q1 is of the NPN type and transistors Q2 and Q3 of the PNP type. The types and potentials could be reversed and the amplifier would still operate. However, it is very desirable that the types be complementary because it minimizes feedback through the sources of potential and immunizes the amplifier to noise and ripple on the operating potentials.

Figure 3:
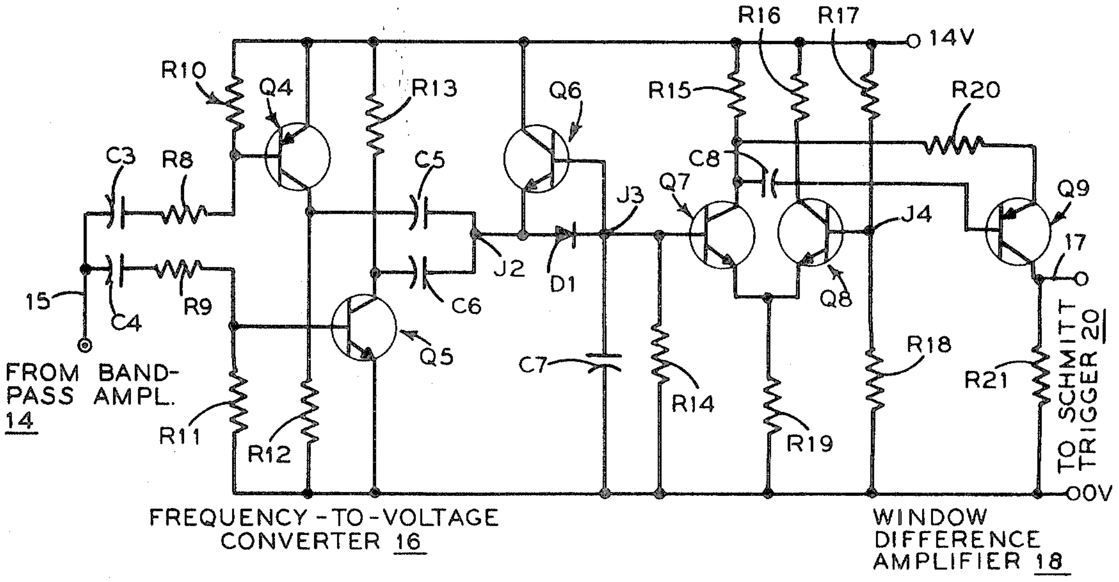
FIG. 3 shows a schematic diagram of one embodiment of a combination of a frequency-to-voltage converter and a difference amplifier incorporated in the transceiver of FIG. 1.

In FIG. 3 there is shown the combination of frequency-to-voltage converter 16 and window difference amplifier 18.

Converter 16 which receives the square wave signal on line 14 comprises PNP-transitor Q4 and NPN-transistor Q5 operating as out-of-phase on-off current switches. The base electrode of transistor Q4 is connected, via resistor R8 and capacitor C3, to line 15, and, via the base return resistor R10, to source of operating potential 14V. The emitter electrode of transistor Q4 is connected to source of operating potential 14V, while its collector electrode is connected via load resistor R12 to source of operating potential OV. Similarly, the base electrode of transistor Q5 is connected, via resistor R9 and capacitor C4, to line 15, and, via resistor R11, to source of operating potential OV. The emitter electrode of transistor Q5 is also connected to source of operating potential OV, while the collector electrode is connected via load R13 to source of operating potential 14V. The collector electrodes of transistors Q4 and Q5 are connected via capacitors C5 and C6, respectively to junction J2.

Junction J2 is connected via diode D1 to junction J3, with the anode of the diode connected to junction J2. NPN-transistor transistor Q6 has its emitter electrode connected to junction J2, its base electrode to junction J3, and its collector electrode to source of operating potential 14V. Junction J3 which is the output of the converter 16 is connected, via output resistor R14, to source of operating potential OV. A deripple filter capacitor C7 is connected in parallel with resistor R14.

In operation, the amplitude of the signal received from line 15 is sufficient to switch the transistors Q4 and Q5 from full on to full off, therefore their collectors always swing between the difference of the two operating potentials, less a minimal voltage drop across the transistor emitter-collector electrodes. Hence uniform amplitude voltage pulses are delivered and the amount of charge delivered per pulse is constant and directly related to the potential difference and the capacitance. Therefore, the average current transferred onto junction J4 is a linear function of the frequency of the input signal. The charge on capacitors C5 and C6 is reset during the off period by current via the emitter of transistor Q6 and load resistors R12 and R13.

A typical charge and discharge cycle of capacitor C5 is as follows. When a pulse is not present on line 15 i.e., the space between two pulses, transistor Q5 is cut off. Current flows from source 14V via resistor R13, capacitor C6, diode D1 and resistor R14 to source OV. When a pulse is present current flows from source 14V, via transistor Q6, capacitor C6 and transistor Q5 to source OV. For capacitor C5 the same effect takes place via transistor Q4, instead of transistor Q5, with transistor Q4 switching on during the absence of a pulse and off during the presence of a pulse. Using a pair of switching transistors and two capacitors effectively doubles the frequency of the signals at junction J2 and simplifies the filtering problems for capacitor C7.

It should be noted that the charging current flows through output resistor R14. It can be shown that the voltage across resistor R14 is linearly related to the frequency of the input square wave at line 15 the value of capacitors C5 and C6, and the difference in potential between the two sources of operating potential. By using stabilized capacitors which are readily available, and for the moment ignoring the potential difference of the sources the output voltage is only related to the input frequency. A 10 percent change in the signal frequency will result in a 10 percent change in the output voltage. With reasonable signal levels, e.g., a nominal 5 volt drop across resistor R14, a 10 percent change in signal frequency is easily discriminated.

The function of the window difference amplifier 18 for selecting out signals within a certain range and to make the circuit insensitive to variations in the operating potentials. Amplifier 18 centers around NPN-transistors Q7 and Q8 arranged in a difference amplifier configuration. The base electrode of transistor Q7 is connected to junction J3 (the output of converter 16) and the collector electrode thereof is connected via load resistor R15 to source 14V. The base electrode of transistor Q8 is connected to the junction J4 of resistors R17 and R18 serially connected across sources of operating potential OV and 14V. A common emitter resistor R19 connects the emitter electrodes of the transistors Q7 and Q8 to source OV.

Resistors R17 and R18 are chosen to establish a reference voltage which determines the amplitude range of the signals to be passed, i.e., determines the window size. The reference voltage is chosen taking into consideration the transition voltage of junction J3, i.e., the voltage related to the transition of the frequencies indicating marks and spaces and the window width. When the voltage of junction J3 exceeds the voltage of junction J4 by a certain amount transistor Q7 starts conducting and because of the coupling through resistor R19 transistor Q8 starts cutting off. This effect regenerates until transistor Q7 is driven into saturation and transistor Q8 is cut off. When the voltage at junction J3 falls below the reference voltage by a certain amount, by a similar action, transistor Q8 is driven into saturation and transistor Q7 is cut off. Within the range the input signal at junction J3 is linearly amplified. The output signal of the difference amplifier is the voltage developed across the collector electrodes of transistors Q7 and Q8 and has a trapazoidal waveform with fixed limits. This voltage is fed across the emitter and collector electrodes of transistor Q9. The emitter electrode of transistor Q9 (a PNP type) is connected via resistor R20 to the collector electrode of transistor Q7, and the base electrode to the collector electrode of transistor Q8. The collector electrode of transistor Q9 is connected via collector load resistor R21 to the source of reference potential OV. When transistor Q7 is cut off, transistor Q9 conducts and line 17, connected to the collector electrode of transistor Q9, is high. When transistor Q7 is saturated, transistor Q9 is cut off and line 17 is low.

It should be noted that the reference voltage at junction J4 is dependent on the differences in potential across the sources, and that the voltage at junction J3 is also dependent on this difference. Therefore, the net result is that there is a cancelling effect and the signals on line 17 is independent of the supply voltage. Therefore, the signals on line 17, assuming stabilized capacitors C5 and C6 only depends on the frequency of the input signal.

Figure 4:
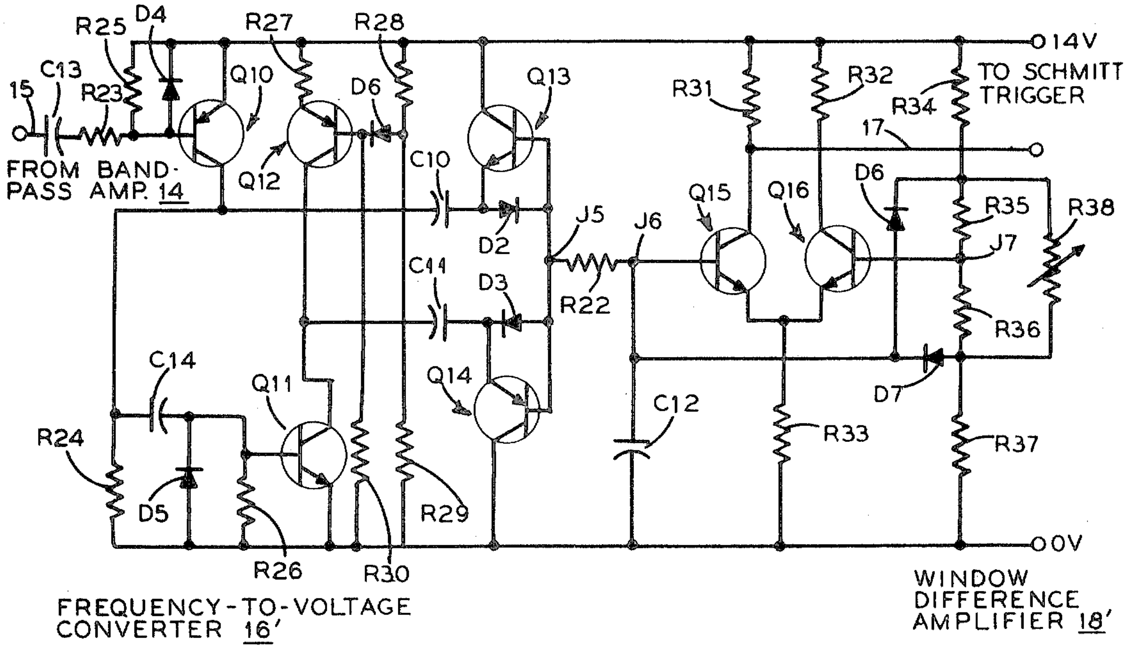
FIG. 4 shows an alternate embodiment of the combination of the frequency-to-voltage converter and the regenerative difference amplifier.

An alternate embodiment of the frequency-to-voltage converter and window difference amplifier 18 which is more immune of noise and variations in parameters is shown in FIG. 4.

Frequency-to-voltage converter 16' is also based on the transfer of a fixed quantity of electric charge per cycle of input square wave. Therefore, the output current is proportional to the frequency at which the transfer occurs. However, in order to increase the circuit gain and to increase noise immunity a reverse quantum of charge is injected simultaneously with the transferred charge. The reverse quantums of charge provide a reverse constant current signal which is independent of frequency. Therefore, if an input cycle is missed neither the transferred charge nor the reverse charge are applied to the output and a possible error is eliminated. The source of the reverse quantums of charge is adjusted so that there is no net output current when the frequency is 2,125 Hz., a positive output current when the frequency is 2225 Hz. (mark) and a negative current when the frequency is 2,025 Hz. (space).

The source of the forward quantums of charge centers around PNP-transistor Q10 and the source of the reverse quantums of charge center around NPN-transistor Q11. The forward quantums of charge are delivered from transistor Q10, via capacitor C10, diode D2, junction J5 and resistor R22 to capacitor C12. The reverse quantums of charge flow from capacitor C12, via resistor R22, junction J5, diode D3 and capacitor C11 to transistor Q11.

Transistor Q10 has an emitter electrode connected to source of operating potential 14V; a base electrode (the input to the converter) connected via resistor R23 and coupling capacitor C13 to line 15; and a collector electrode connected, via resistor R24, to source of operating potential OV. Base return resistor R25 and diode D4 connect the base electrode to source 14V. Diode D4 is polarized opposite the polarity of the base-emitter junction of transistor Q10 to prevent the accumulation of charge on capacitor C13.

Transistor Q11 has an emitter electrode connected to source of operating potential OV; a collector electrode connected to a constant current source centered around PNP-transistor Q12; and a base electrode connected via coupling capacitor C14 to the collector of transistor Q10. Base return resistor R26 and diode D5 connect the base electrode to source OV. Diode D5 is oppositely polarized to the base-emitter junction of transistor Q11 to prevent the accumulation of charge on capacitor C14.

Constant-current source transistor Q12 has an emitter electrode connected, via resistor R27, to source 14V; a collector electrode connected to the collector electrode of transistor Q11; and a base electrode, connected via temperature compensating diode D6, to the junction of serially connected bias establishing resistors R28 and R29 connected across sources of operating potential 14V and OV. Resistor R30 connects the junction of the base electrode and the anode of diode D6 to source OV.

Charge transfer capacitor C10 connects the collector electrode of transistor Q10 to the anode of diode D2 whose cathode is connected to junction J5. Capacitor charge reset transistor Q13 has: an emitter electrode connected to the junction of capacitor C10 and diode D2; a collector electrode connected to source 14V; and a base electrode connected to junction J5.

Charge transfer capacitor C11 connects the collector electrode of transistor Q11 to the cathode of diode D3 whose anode is connected to junction J5. Capacitor charge reset transistor Q14 has: a collector electrode connected to source of operating OV; a base electrode connected to junction J5 and an emitter electrode to the junction of capacitor C11 and diode D3.

When the negative pulse (actually the negative excursion) of the square wave is present on line 15 transistor Q10 switches to the full on state with its collector electrode being substantially at the potential of source 14V. A quantity of charge proportional to the collector electrode voltage and the capacitance of capacitor C10 is delivered to capacitor C12. At the same time transistor Q11 switches on and quantity of charge that was accumulated on capacitor C11 resulting from the collector current of transistor Q11 (constant current source) is removed from capacitor C12. At the end of the negative pulse capacitor C10 is fully discharged by the action of transistor Q13 and capacitor C11 is fully discharged by the action of transistor Q14.

Now, since the quantum of charge delivered via capacitor C10 is related to the repetition rate of the negative pulse and other fixed parameters i.e., the capacitance of capacitors C10 and C12 and the potential of source 14V, the current flow into junction J5 by virtue of the switching of transistor Q10 is time or frequency dependent. However, since capacitor C11 is charged via the constant current source of transistor Q12, the charge transferred by transistor Q11 is constant and time independent. It can be shown that the constant collector current of transistor Q12 makes a constant reverse current flow from junction J5 via capacitor C11 by virtue of the switching of transistor Q11. Therefore, a fixed current is always subtracted from a time or frequency dependent current which is injected from capacitor C10 via diode D2 unto junction J5 and the resultant current flows to or from capacitor C12 via resistor R22 and the voltage across capacitor C12 is frequency dependent. Now, by a suitable choice of parameters the resultant current can be chosen to be zero at the frequency of $f_o$=2125 Hz. i.e., midway between the mark and space frequencies. Thus, if the input frequency is greater than $f_o$, the voltage across capacitor C12 increases and if the input frequency is less than $f_o$ the voltage decreases.

The voltage across capacitor C12, or the voltage at junction J6 is monitored by window difference amplifier 18′.

Difference amplifier 18′ is centered around NPN-transistor Q15 and Q16. Transistor Q15 has a base electrode connected to junction J6 and a collector electrode connected, via resistor R31, to source 14V and directly to line 17 (the output of the amplifier). Transistor Q16 has a base electrode connected to a reference voltage at junction J7, and a collector electrode connected, via resistor R32 to source 14V. The emitters of the transistors are connected, via resistor R32, to source OV. The reference voltage is established by resistors R34, R35, R36 and R37 connected in series across the sources 14V and OV with junction J7 at the junction of resistors R35 and R36. The cathode of diode D6 is connected to the junction of resistors R34 and R35 and its anode is connected to junction J6. The anode of diode D7 is connected to the junction of resistors R36 and R37 and its cathode is connected to the junction J6.

Initially the action diode D7 clamps the voltage at junction J6 to a value less than the voltage at junction J7. Therefore, transistor Q15 is cut off and transistor Q16 is conducting, the signal on line 17 is high. When the voltage at point J6 reaches a certain value related to the reference voltage transistor Q15 starts conducting and there will be linear amplification until a second certain level is reached. At that time linear amplification stops. However, the voltage at junction J6 can still increase until the clamping action of diode D6 takes over. Thus, the amplifier 18′ will generate a trapezoid waveform within limits fixed by the reference voltage. In addition, the voltage at junction J6 can only swing between limits determined by the voltages at junctions of resistors R34 and R35, and R36 and R37, the voltage at junction J6 will always move from fixed levels regardless of the number of sequential marks or sequential spaces. It also should be noted that the use of a reference voltage proportional to the supply voltage makes the output signal independent of the operating potentials.

By choosing the clamping voltages for diodes D6 and D7 a delay can be introduced which prevents the difference amplifier from changing state until the voltage at junction J6 changes by a given amount. Since this voltage changes by a fixed amount per cycle of input signal, the change in state can be controlled to occur only after a given number of cycles after the change in frequency. Thus a missing cycle will not give spurious switching of the amplifier. Variable resistor R38 is used to select the delay.

While only a limited number of embodiments have been shown and described in detail there will now be obvious to those skilled in the art many modifications and variations satisfying the objects but which do not depart from the spirit of the invention as defined by the appended claims.

What is claimed is:

1. Apparatus for converting a carrier signal switching between first and second frequencies to a voltage shifting between first and second amplitudes comprising a frequency-to-voltage converting means for generating only one voltage signal having an amplitude linearly related to the frequency of a received signal, and a window difference amplifier means having only one signal input for receiving said voltage signal generated by said converting means, a reference voltage input maintained at a reference voltage of a given amplitude and and output for transmitting a signal having a first amplitude when said voltage signal has an amplitude greater than a first value related to the amplitude of said reference voltage and for transmitting a voltage having a second amplitude when said voltage signal has an amplitude less than a second value related to said reference voltage and for linearly amplifying signals when the amplitude of said voltage signal is between said first and second values.

2. The apparatus of claim 1 wherein said frequency-to-voltage converter means comprises first means for shaping the carrier signal to current pulses of uniform amplitude, a first capacitor having first and second terminals, said first terminal being connected to said first shaping means, first and second sources of operating potential, a second capacitor having a first terminal connected to said first source of operating potential and a second terminal, a unidirectional current conducting device connecting the second terminal of said first capacitor to the second terminal of said second capacitor, a transistor having, base, emitter and collector electrodes, said emitter electrode being connected to the second terminal of said first capacitor and said base electrode being connected to the second terminal of said second capacitor so that the base-emitter path of said transistor is in parallel with said unidirectional current conducting device, said transistor being of such a type that the current flow in said base-emitter path is opposite to the current flow through said unidirectional current conducting device, means for connecting the collector electrode of said transistor to said second source of operating potential and a resistor connecting the second terminal of said second capacitor to one of said sources of operating potential whereby the amplitude of the signal developed across said resistor is linearly related to the frequency of the carrier signal.

3. The apparatus of claim 2 further comprising second means for shaping the carrier signal to current pulses of uniform amplitude but opposite in phase to the current pulses from said first shaping means, and a third capacitor having a first terminal connected to said second shaping means and a second terminal connected to the second terminal of said first capacitor.

4. A frequency-to-voltage converter for converting a frequency varying signal to a voltage signal whose amplitude is a function of the frequency varying signal comprising first means for shaping the frequency varying signal into current pulses of uniform amplitude and a given phase, second means for shaping the frequency varying signal into current pulses of uniform amplitude and a phase opposite to said given phase, a first capacitor having a first terminal connected to said first shaping means, a second capacitor having a first terminal connected to said first shaping means and a second terminal, junction means for interconnecting the second terminals of said first and second capacitors, first and second sources of operating potential, a third capacitor having a first terminal connected to said first source of operating potential and a second terminal, a unidirectional current conducting device connecting the second terminal of said third capacitor to said junction means, a transistor having base, emitter and collector electrodes, said emitter electrode being connected to said junction means, said base electrode being connected to the second terminal of said third capacitor whereby the base-emitter path of said transistor is in parallel with said unidirectional current carrying device but polarized opposite thereto, means for connecting the collector electrode of said transistor to said second source of operating potential and a resistor connecting the second terminal of said third capacitor to one of said sources of operating potential.

5. A frequency-to-voltage converter comprising means adapted to receive a square wave signal, a charge accumulating capacitor, a source of reference potential, means for connecting a first terminal of said capacitor to said source of reference potential, first means connected to the other terminal of said capacitor for delivering the same fixed quantum of charge to said capacitor during each half period of said square wave signal, and second means connected to said other terminal of said capacitor for removing a variable quantum of charge from said capacitor during each of said half period wherein the magnitude of said variable is dependent on the duration of said half period.

6. The frequency-to-voltage converter of claim 5 wherein said first means comprises a first switching means having an output which switches between two potential levels under the control of said square wave signal, a second capacitor and means connecting said second capacitor between the output of said first switching means and said charge accumulating capacitor.

7. The frequency-to-voltage converter of claim 6 wherein one terminal of said second capacitor is connected to the output of said first switching means and further comprising a unidirectional current transmission device connecting the other terminal of said second capacitor to the first terminal of said charge accumulating capacitor.

8. The frequency-to-voltage converter of claim 7 further comprising a transistor having base, emitter and collector electrodes, means for applying a first operating potential to said collector electrode, means for connecting the emitter-base junction of said transistor in parallel with said unidirectional current transmission device wherein said emitter-base junction is polarized opposite to said unidirectional current transmission device.

9. The frequency-to-voltage converter of claim 6 wherein said second means comprises a constant current source, a second switching means having an output, a third capacitor and means for connecting the output of said second switching means to the first terminal of said charge accumulating capacitor, said second switching means alternately connecting said constant current source and said first source of operating potential to said second capacitor under the control of said square wave signal.

10. The frequency-to-voltage converter of claim 9 wherein one terminal of said third capacitor is connected to the output of said second switching means and further comprising a unidirectional current transmission device connecting the other terminal of said third capacitor to the first terminal of said charge accumulating capacitor.

11. The frequency-to-voltage converter of claim 10 further comprising a transistor having base, emitter and collector electrodes, means for applying a first operating potential to said collector electrode, means for connecting the emitter-base junction of said transistor in parallel with said unidirectional current transmission device wherein said emitter-base junction is polarized opposite to said unidirectional current transmission device.

12. The frequency-to-voltage converter of claim 5 further comprising a difference amplifier means having a signal input, a reference input, and an output, means for connecting said signal input to the first terminal of said charge accumulating capacitor, and means for applying a reference voltage to said reference input whereby the signal at said output is a function of the amplitude relationship between the voltage across said charge accumulating capacitor and the reference voltage.

13. The frequency-to-voltage converter of claim 5 further comprising means to limiting the voltage across said charge accumulating capacitor to a limited range which brackets said reference voltage.

* * * * *